United States Patent [19]

Landers

[11] 4,350,362
[45] Sep. 21, 1982

[54] SELF-CENTERING TRAILER HITCH

[75] Inventor: Donald F. Landers, Grosse Pointe, Mich.

[73] Assignee: PSI Mobile Products, Inc., Mount Clemens, Mich.

[21] Appl. No.: 192,179

[22] Filed: Sep. 29, 1980

[51] Int. Cl.³ .............................................. B60D 7/00
[52] U.S. Cl. ............................................... 280/478 A
[58] Field of Search ........... 280/478 A, 478 R, 478 B, 280/477; 172/272

[56] References Cited

U.S. PATENT DOCUMENTS 3,126,210 3/1964 Hill ................................. 280/478 A
3,912,119 10/1975 Hill et al. ........................ 280/478 A

FOREIGN PATENT DOCUMENTS 661733 6/1938 Fed. Rep. of Germany ... 280/478 A

Primary Examiner—John A. Pekar
Attorney, Agent, or Firm—Burton, Parker & Schramm

[57] ABSTRACT

A self-centering trailer hitch includes a housing intended to be secured to either a tractor or trailer, with a guide tube laterally pivotally supported on the housing, an extensible and retractable tongue is telescoped into the tube, cooperable cam wedges and rollers on the housing and tongue urge the tongue and tube to a centered towing position as the tractor is backed toward the trailer, and detent means automatically lock the tube and the tongue in centered towing positions. The tongue may also be centered and locked for towing following connection of the hitch by moving the tractor ahead to align the tongue with the centerline of the vehicles and then backing the tractor toward the trailer until the detent locks the parts together.

6 Claims, 4 Drawing Figures

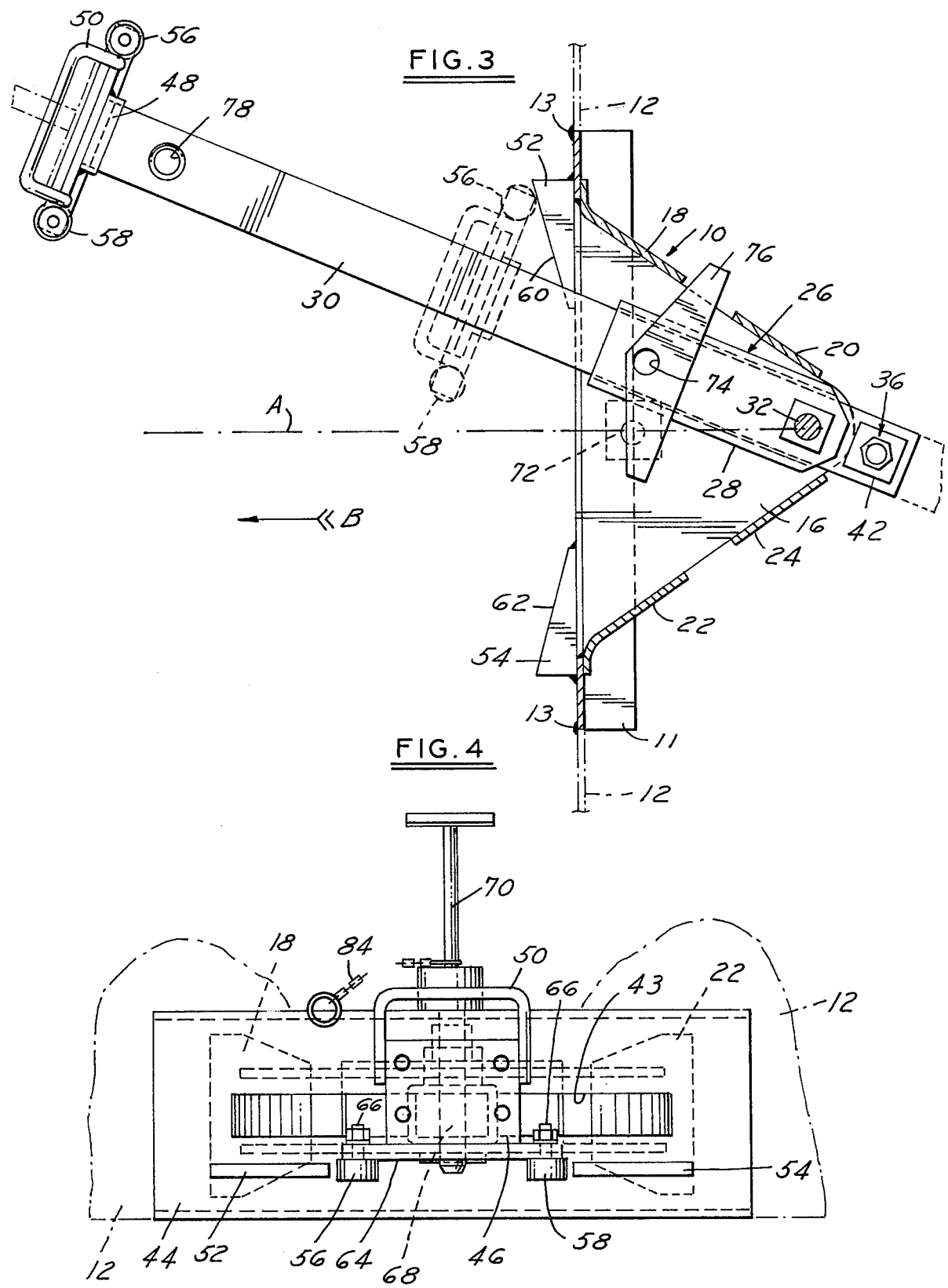

4,350,362

SELF-CENTERING TRAILER HITCH

DESCRIPTION

FIELD OF INVENTION

This invention relates to a trailer hitch which is longitudinally extensible and laterally swingable to facilitate coupling a towing vehicle to a trailer.

BACKGROUND OF THE INVENTION

To avoid the necessity of precisely positioning a towing vehicle, or tractor, in relation to the trailer in order to couple the two together, it has been suggested in the prior art that an extensible and swingable hitch be provided on one of the vehicles which will enable the tractor to be only approximately positioned, the two vehicles then connected, and in various ways the hitch is then centered and locked for further towing operations. Representative prior art patents disclosing such hitches are as follows:

U.S. Pat. No. 2,973,971
U.S. Pat. No. 3,083,986
U.S. Pat. No. 3,329,445
U.S. Pat. No. 3,397,900
U.S. Pat. No. 3,521,908
U.S. Pat. No. 3,612,576
U.S. Pat. No. 3,698,739

Of the foregoing patents, U.S. Pat. No. 3,698,739, as well as several others, enable the hitch to be centered following coupling of the tractor and trailer by backing the tractor toward the trailer, causing cooperating parts of the hitch to react in such fashion that the hitch is forced into alignment with the longitudinal axis of the tractor or trailer so that the hitch may be locked for forward towing operations. Each of these prior art efforts contains some meritorious features, as well as some disadvantages as will be apparent to those skilled in the art.

SUMMARY OF THE INVENTION

My hitch is adapted to be mounted as a unit either on a towing vehicle, (hereinafter referred to as a tractor) or upon a trailer vehicle. It includes an extensible and retractable tongue which is laterally swingable by the operator to facilitate coupling the two vehicles together. Once coupled, the drive may effect centering of the hitch in either of two ways, or a combination thereof. First, the driver may pull ahead a short distance until the trailer and tractor are in towing alignment and may then back up the tractor until the hitch automatically locks in normal towing position. Alternatively, the driver may simply back the tractor toward the trailer and the tongue will be forced into proper alignment and the hitch automatically locked in towing position. In a combination of the two methods, the driver may pull ahead slightly but insufficiently to fully align the trailer and tractor, and then may back the trailer toward the trailer, causing the hitch to be moved into normal towing position and automatically locked therein.

My improved hitch includes a housing within which is pivotally mounted a guide tube. A tongue is telescoped in the tube. Provision is made for mounting a coupling device at the outer end of the tongue. A locking pin cooperates with the housing, tube and tongue to lock the elements in operative towing position. The pin is readily removable by the driver to permit extension and swinging of the tongue to facilitate coupling of the towing and trailer vehicles. Apart from the pin, there are only two movable parts in the hitch.

BRIEF DESCRIPTION OF THE DRAWINGS

FIG. 3 is a cross-sectional view taken substantially on a line 3—3 of FIG. 2 but showing the tongue extended and swung to one side; and FIG. 4 is an end view of the hitch, looking at the rear of a tractor upon which the hitch is mounted.

BRIEF DESCRIPTION OF PREFERRED EMBODIMENT

Figure 1:
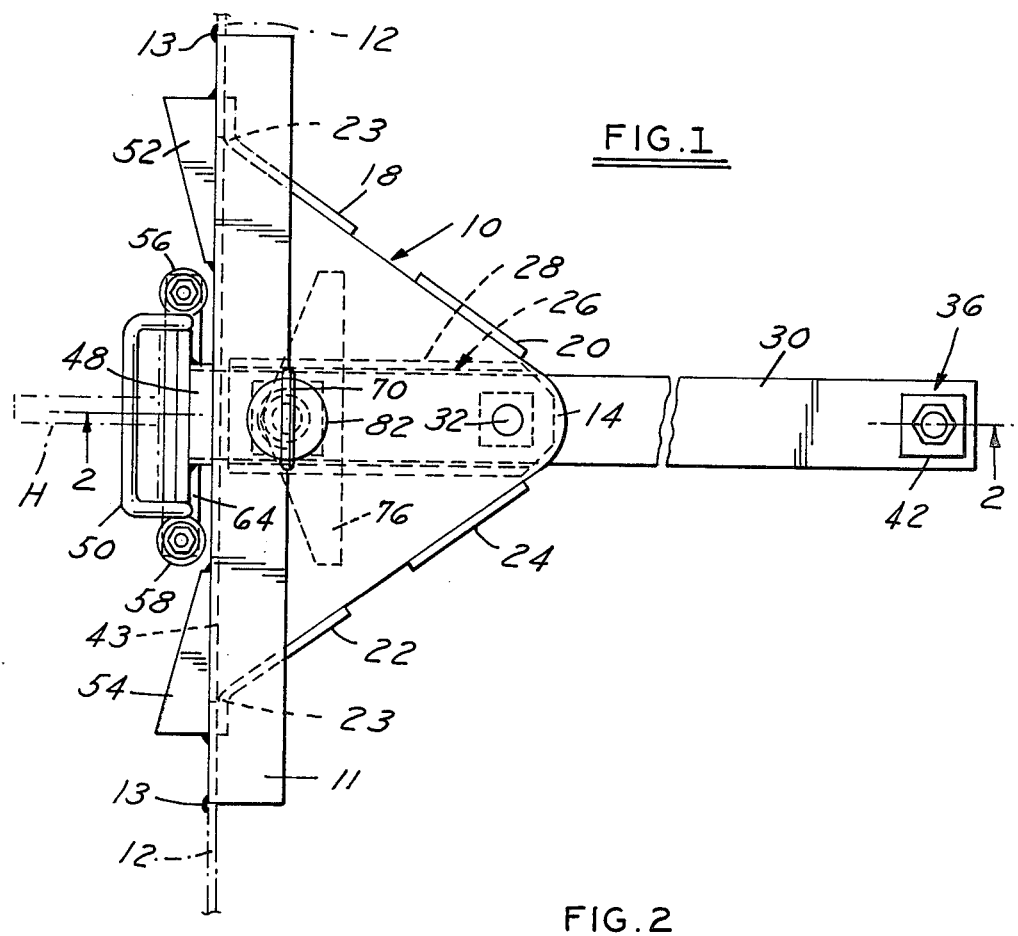
FIG. 1 is a plan view of my trailer hitch showing it in locked towing position.

As shown in the drawings, my trailer hitch comprises a housing 10 having a transverse structural channel 11, upper and lower plates 14 and 16 of generally triangular shape welded to the channel, with vertical walls 18, 20, 22 and 24 welded to the edges of the plates. Wall elements 18 and 22 are bent at 23 and welded to the transverse channel. The housing may be attached to the towing vehicle, or tractor 12, or to the trailer, in any suitable fashion, as by welding 13.

Supported within housing 10 for swingable movement about an arc of approximately 70° is a drawbar assembly 26 comprising a tube 28 of rectangular cross-section and an extensible and retractable tongue 30 slidably telescoped in the tube. The tube is pivotally connected to the housing by pivot pins 32 and 34 which are welded to plates 14 and 16 of the housing. A reinforcing spacer 36 is welded to the tube and encircles pin 32 between the tube and plate 14.

The tongue 30 is of rectangular cross-section and is slidably and swingably supported by the tube 28. The inner end of the tongue is provided with removable stop means 36 comprising a bolt 38 extending through the tongue with a pair of washers 40 and 42 and a lock nut and washer assembly 44 on the bolt. This stop assembly, upon being disconnected from the tongue, enables the latter to be withdrawn from the housing.

The opposite end of the tongue projects through an elongated slot 43 in the vertical web 44 of the transverse beam or channel 11 and is adapted to carry means for attaching the tongue to the trailer or other vehicle to be towed. I have shown a pintle hook in phantom outline at H in FIG. 2, but it should be understood that any suitable hitching means may be mounted on the tongue.

Figure 2:
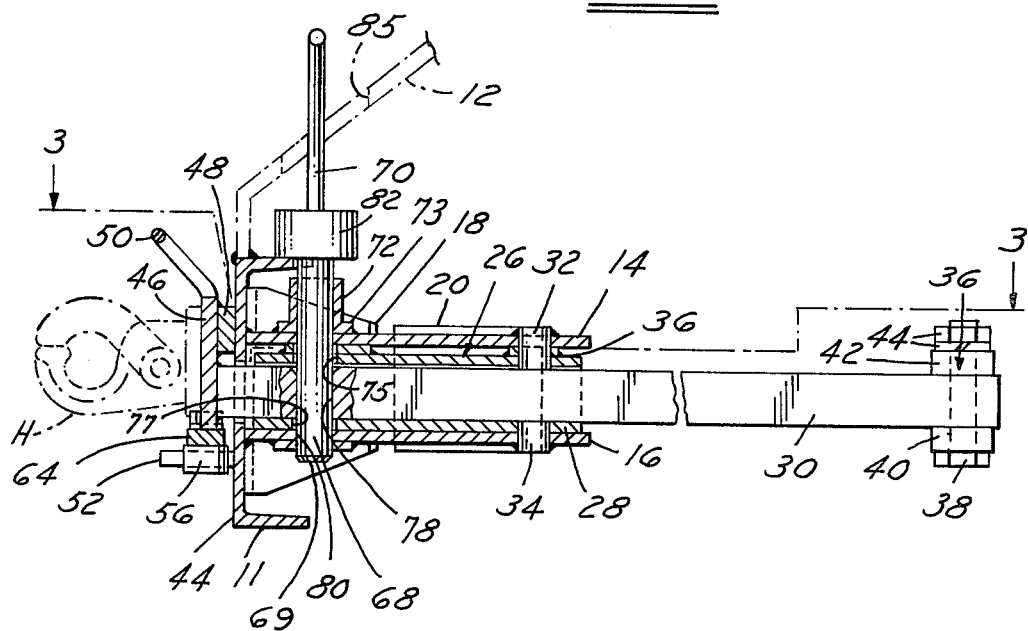
FIG. 2 is a cross-sectional view taken on a line 2—2 of FIG. 1.

A vertical plate 46 is welded to the end of the tongue, and the pintle hook is fastened to plate 46. Spacer block 48 is secured to plate 46 to bear against the vertical web 44 of the transverse beam 11 when the tongue is fully retracted, as shown in FIGS. 1 and 2. A handle 50 on the plate 46 enables the operator to swing the hitch while keeping his fingers from between the hitch and the transverse beam 11 or the tractor 12.

Centering means are provided for automatically centering the tongue after the hitch has been connected to the vehicle to be towed. Such means includes a pair of cam wedges 52 and 54 mounted on the vertical web 44 which cooperate with a pair of rollers 56 and 58, mounted on the outer end and at opposite sides of the tongue 30. The wedges have inclined surfaces 60 and 62 facing toward the tongue and against which the rollers can bear, as shown best in FIG. 3. A horizontal plate 64 is secured to the lower edge of plate 46 and the rollers are attached to opposite ends of plate 64 by suitable bolts or the like 66.

To lock the hitch for towing, a pin 68 having a bevelled lower end 69 and a T-shaped handle 70 at the upper end is received downwardly through a guide bushing 72 mounted on the top of housing 10. The guide bushing includes a reinforcing flange 73 which is welded to the plate 14. The bushing is aligned with an aperture in the plate 14 and the pin is adapted to extend through an aperture 74 in a triangularly shaped stop plate 76 (or pin stop means) mounted on the top of the tube 28. Aperture 74 is aligned with aperture 75 in the top of the tube and another aperture 77 in the bottom of the tube. When the tongue is fully retracted and centered in the housing as shown in FIG. 1, the pin will drop through an aperture 78 in the tongue and into an aperture 80 in the lower plate 16 of the housing, thereby locking the tongue and housing against relative movement. A stop shoulder 82 on the pin limits projection of the pin and also adds weight thereto, assisting gravity entry of the pin through the tongue. A tether chain 84 may be provided. The tractor has an opening 85 through which the pin is received.

In operation, a tractor equipped with my improved hitch is backed in the direction of arrow B (see FIG. 3) to a position locating the pintle hook H in proximity with the attaching point of the trailer to be towed (not shown). The operator then lifts pin 68 out of the tongue and tube, and grasping handle 50 extends the tongue and swings it as in FIG. 3, to bring the pintle H into coupling relation with the trailer. With the pin 68 seated in the guide bushing 72, the lower end 69 of the pin will rest on the stop plate 76, thereby preventing the pin from dropping through the housing before the tube and tongue have returned to a centered position. After coupling the hitch to the trailer and with the pin 68 resting in bushing 72 as aforesaid, the operator can then proceed in either of two ways to retract the tongue into the proper load-pulling position.

According to the first method, the operator moves the tractor forward, which will serve to straighten the tongue and tube in the housing as the trailer swings into alignment with the tractor. When the tongue and tube have swung from the FIG. 3 position to one of alignment with the center line of the housing, i.e., to coincidence with longitudinal axis A shown in FIG. 3, the pin 68 will drop into the aperture 74 in the stop plate, locking the tube on axis A against further swinging movement and thereby locking the tongue against swinging movement. While the operator may continue to drive the tractor forward, the hitch is not yet in its intended normal operating condition. At this point the lower end 69 of the pin rests on the top of the tongue. If the operator reverses the direction of movement of the tractor, backing it up, as this occurs the tongue will slide into the tube until aperture 78 therein is aligned with aperture 74 and the pin 68 will drop through the tongue and through aperture 77 and into aperture 80 in the lower plate of the housing, thereupon locking the drawbar assembly for further towing operations.

According to the second method, after the operator has backed up the tractor and coupled the pintle H to the trailer, he then continues to back slowly, thereby forcing the tongue 30 to slide into the tube, causing, as can be seen from observing FIG. 3, the roller 56 to ride the wedge cam surface 60, thereby forcing the tongue to swing to the center line A as it is pushed into the tube, with the parts eventually assuming the FIG. 1 position.

With the tongue and tube on the axis A and the tongue fully retracted, the pin 68 will drop by gravity through aligned apertures 74 and 78, locking the drawbar assembly for further towing operations.

The pin 68 should be suitably hardened, as should those portions of the tongue around aperture 78, to prevent deformation or elongation.

While I have described my hitch as being mounted on the tractor vehicle, it will be appreciated by those skilled in the art that the hitch assembly may be mounted on the trailer vehicle. In addition, while I have shown a pintle hook H in FIG. 2, other types of connectors may be provided, such as a ball type connector or a socket connector for cooperation with a ball type connector. It will also be appreciated, that, not counting the pin 68, there are only two moving parts in my hitch, namely, the tube 26 and the telescoping tongue 30.

I claim:

1. A self-centering hitch comprising:
   a housing,
   a guide tube pivotally mounted on the housing for swingable movement about a vertical axis,
   a tongue telescoped into the tube and longitudinally shiftable therein between an extended trailer attaching position and a retracted towing position,
   the housing, guide tube and tongue each having an aperture with such apertures disposed in alignment when the guide tube is centered on the housing and the tongue is in the retracted towing position, and
   a locking pin mounted on the housing for extension through said apertures as they are disposed in alignment to lock the hitch in a towing position.

2. The invention defined by claim 1 wherein said tongue and housing have cooperating cam and follower means for urging the tube and tongue to a centered position on the housing as the tongue is retracted into the tube.

3. The invention defined by claim 2 wherein the tongue projects beyond an end of the housing and the cam means comprises cam wedges on such end of the housing at opposite sides of the tongue, and the cam follower means are mounted on the tongue to cooperate with the cam wedges as the tongue is retracted into the tube.

4. The invention defined by claim 1 characterized by pin stop means on the tube for preventing interference between the pin and tube unless the tube is centered on the housing whereat the pin will extend through the apertures in the housing and tube to lock the tube in centered position on the housing.

5. The invention defined by claim 4 wherein said pin stop means on the tube comprises a plate projecting beyond opposite sides thereof and underlying the locking pin and having an arcuate length sufficient to support the pin against interference with the tube during swinging thereof except when the tube is centered on the housing.

6. A trailer hitch comprising, in combination:
   a housing intended to be mounted on a towing or towed vehicle and having a pair of vertically spaced upper and lower plates,
   a guide tube pivotally supported between the plates for laterally swingable movement,
   a tongue telescoped into the guide tube and supported thereby for swingable movement therewith and extension and retraction relative thereto and having a projecting end disposed beyond the housing for coupling with another vehicle, a pair of cam wedges on the housing on opposite sides of the projecting end of the tongue having inclined surfaces facing toward the tongue, cam followers on the tongue for cooperating with said inclined surfaces, aligned apertures in said upper and lower plates, transverse apertures in the tube alignable with the plate apertures when the tube is centered in the housing, a transverse aperture through the tongue alignable with the tube and plate apertures when the tongue is retracted into the tube, pin means for projection down through said apertures when the same are aligned, and a pin stop plate on the tube extending transversely thereof for an arcuate distance sufficient to support the pin against interference with swinging movement of the tube except when the tube is centered on the housing.

* * * * *